United States Patent [19]
Baron et al.

[11] Patent Number: 5,940,776
[45] Date of Patent: Aug. 17, 1999

[54] AUTOMATED REAL-TIME WEATHER GRAPHICS GENERATING SYSTEMS AND METHODS

[75] Inventors: Robert O. Baron, Huntsville; Tom S. Thompson, Athens; Tony L. Benson, Huntsville, all of Ala.

[73] Assignee: Baron Services, Inc., Huntsville, Ala.

[21] Appl. No.: 08/835,950

[22] Filed: Apr. 11, 1997

Related U.S. Application Data

[60] Provisional application No. 60/015,423, Apr. 12, 1996.
[51] Int. Cl.⁶ ..................................................... G06F 19/00
[52] U.S. Cl. ................................................................ 702/4
[58] Field of Search ........................ 702/3, 4, 5; 342/26, 342/460; 345/327, 328; 348/592, 598, 599

[56] References Cited

U.S. PATENT DOCUMENTS

| | | | |
|---|---|---|---|
| 4,725,886 | 2/1988 | Galumbeck et al. | 348/461 |
| 5,023,934 | 6/1991 | Wheeless | 455/45 |
| 5,140,419 | 8/1992 | Galumbeck et al. | 348/465 |
| 5,379,215 | 1/1995 | Kruhoeffer et al. | 364/420 |
| 5,517,193 | 5/1996 | Allison et al. | 342/26 |
| 5,568,385 | 10/1996 | Shelton | 364/420 |
| 5,583,972 | 12/1996 | Miller | 395/119 |
| 5,805,156 | 9/1998 | Richmond et al. | 345/328 |

OTHER PUBLICATIONS

Gilhousen, D.B., "Methods of Obaining Weather Data in Real Time", Oceans '88: A Partnership of Marine Interests, vol. 4, 1988, pp. 1341–1343, Nov. 1988.

*Primary Examiner*—Donald E. McElheny, Jr.
*Attorney, Agent, or Firm*—Alston & Bird LLP

[57] ABSTRACT

An automated real-time weather graphics generating system and method includes a host computer that receives meteorological data from a plurality of real-time meteorological data sources and then multiplexes the meteorological data into a serial data stream, a vertical blanking interval (VBI) inserter that inserts the data stream into a vertical blanking area of a television broadcast signal for broadcast to a remote location, a VBI receiver at the remote location that filters the data stream from the television broadcast signal, and a remote computer that combines the data stream and geographical views to form weather images comprising the meteorological data. The weather images can then be converted into a television compatible format (e.g., NTSC or PAL) for broadcast to subscribers on the dedicated channels. The weather images may also include crawling or scrolling text messages generated by a character generator card associated with the remote computer.

31 Claims, 8 Drawing Sheets

Local Current Conditions

| | |
|---|---|
| Temperature | 65 |
| Humidity | 45% |
| Wind | NNE - 15 mph |
| Rainfall | 0.12" |

FIG. 6

Alabama Zone Forecasts
National Weather Service
Birmingham, AL

.Tonight... A chance of rain early... then clearing and cooler. Low near 40. Northwest wind 10 to 15 mph. Chance of rain 30 percent. Thursday... Mostly sunny. High around 60. Northwest wind 10 to 15 mph.

*FIG. 7*

AUTOMATED REAL-TIME WEATHER GRAPHICS GENERATING SYSTEMS AND METHODS

RELATED APPLICATIONS

This application claims the benefit of U.S. Provisional Application No. 60/015,423, filed Apr. 12, 1996, and entitled "REAL-TIME AUTOMATED WEATHER GRAPHICS SYSTEM AND METHOD".

FIELD OF THE INVENTION

The present invention generally relates to weather graphics systems and methods, and more particularly, to weather graphics systems and methods that generate real-time localized weather graphics.

BACKGROUND OF THE INVENTION

The importance of weather reporting and forecasting in our daily lives cannot be contested. A large percentage of the people in the United States watch their local evening news on a nightly basis just to see the local weather report and forecast. This information is then used to make decisions for the next day, or even for the upcoming weekend, such as what to wear, what activity to do, what activity not to do, what to bring on an outing, etc. Under certain circumstances, such as in the case of severe weather, people sometimes find themselves in situations where they are making life and death decisions based upon the weather information they have available to them.

To assist local television stations, as well as the national networks, in providing accurate and timely weather reporting and forecasting, the National Weather Service (NWS) maintains a network of radar installations located at some one hundred thirty-eight sites throughout the United States. Observers at each of these installations monitor the weather conditions within their area and provide hourly teletyped messages to subscribers, typically through a third party weather service provider such as GTE Contel, a subsidiary of GTE Government Systems. In addition, other services provide lightning strike information on a subscription basis, such as through Global Atmospherics, Arizona, U.S.A.

The weather information provided by any one or a combination of the above services is typically synthesized at the local television station into a understandable format for presentation to the public. Several commercially available systems provide this capability, such as the FasTrac™ by Baron Services, Inc., Huntsville, Ala., U.S.A. In general, these systems combine a geographical and topographical image map with meteorological data, such as radar and lightning, in an overlying fashion. In addition, the local temperatures for various communities or cities within the viewing area of the station may also be generated on the image map. A sequence of these composite weather images can be looped to create weather animation.

A detailed description of one such system is provided in U.S. Pat. No. 5,583,972 to Miller. Briefly, the Miller patent describes a weathercasting system for displaying real-time photo-realistic three-dimensional pictorial representations of weather conditions created from meteorological data combined with geographical and topographical data. The meteorological data is combined with the geographical and topographical data to produce a digital signal capable of being transmitted to a computer, displayed on a computer display screen, or manipulated by peripheral devices connected with the computer.

However, current weather graphics systems have several limitations associated with them, a few of which are delineated below. First, they generally cover large areas and do not provide localized meteorological information. Second, the graphical images generated by these systems are typically not made available to subscribers on a continuous basis for viewing at any time, but are merely provided at specific times throughout the day. Third, many of these weather graphics systems rely on current weather condition data that is manually entered via a keyboard.

In today's culture, there is a growing demand by the consuming public to have real-time information provided on demand. This desire has surely been fueled by the technological advancements made in broadcast and point to point communication networks, not to mention the advancements in computer technology. This also holds true for weather reporting and forecasting. As evidence of this trend, one needs to look no further than the popularity and success of The Weather Channel™. The Weather Channel™ began in 1982 with a national audience of around 2.5 million homes and currently has an audience of over 63 million homes. As is familiar to those who have viewed The Weather Channel's™ programming, The Weather Channel™ provides national and regional weather reporting and forecast, including real-time relays of severe weather watches and warnings. Further, The Weather Channel™ provides all this programming 24 hours-a-day, seven days a week, and thereby fulfills a need of the consuming public. As another example of the desire to have real-time weather information on demand, numerous weather services have developed websites which provide weather information on the World Wide Web, including The Weather Channel™ at http://www.weather.com, and Weather Services International's Intellicast at http://www.intellicast.com. However, these systems are severely limited as to the amount and detail of localized information they can provide. Typically, these systems are only able to provide the temperature and sky conditions for particular cities. Some of the Internet weather services are able to provide a graphical image of the weather conditions for the entire United States, or possibly, a region thereof, but not for a localized area.

Therefore, a need exists in the industry for a weather graphics system that is capable of providing real-time weather graphics for a localized area on a continuous fashion.

SUMMARY OF THE INVENTION

The present invention overcomes the inadequacies and deficiencies of the prior art as discussed hereinbefore and as well known in the industry. The present invention provides for automated real-time weather graphics generating systems and methods in which meteorological data is collected and multiplexed into a single data stream at a host computer, and is then transmitted via the vertical blanking area of a television broadcast signal to a remote computer for further processing. The remote computer extracts the data stream from the television broadcast signal and combines the meteorological data from the data stream and other local meteorological data with geographical and topographical image maps to create graphical weather images of real-time weather for a localized area. Because of the nature of the real-time weather graphics generating systems and methods in accordance with the present invention, they can be automated to operate without supervision so as to provide continuous viewing.

In architecture, the present invention can be implemented by a host computer that receives meteorological data from a plurality of real-time weather data sources and then multiplexes the meteorological data into a serial data stream. For purposes of illustrating the present invention, meteorological data shall include but is not limited to one or more of National Weather Service (NWS) messages, lightning strike data, and radar. A vertical blanking interval (VBI) inserter then inserts the serial data stream into a television broadcast signal for transmission to a remote location where a remote computer resides. A VBI receiver at the remote location extracts the serial data stream from the television signal and sends it to the remote computer. The remote computer combines the data stream with image maps to form weather images that comprise real-time weather data. A scan converter then converts the weather images from a video graphics array (VGA) or other similar video format into a signal suitable for television broadcast, such as the National Television Standards Committee (NTSC) format, the phase alternating line (PAL) format, or a digital television format. Once converted, the weather images can be broadcasted to cable subscribers on dedicated channels. In accordance with a feature of the present invention, the remote computer can combine other meteorological data in addition to, or as an alternative to, that in the serial data stream to form the weather images. For example, local meteorological data such as temperature, rainfall, humidity, and barometric pressure may be retrieved from a local sensor pack at the remote computer or elsewhere. Further, external commands can be sent to the remote computer over the public switched telephone network (PSTN) which is interconnected with the remote computer by a modem.

In accordance with another feature of the present invention, the remote computer executes a remote program that includes a cable communication mechanism, a weather wire mechanism, and a graphics generation mechanism. The cable communication mechanism reads in the meteorological data from the VBI receiver and the local sensor pack, and interfaces with the modem for receiving external commands. The cable communication mechanism sends National Weather Service (NWS) messages to the weather wire mechanism where they are placed in individual files having descriptive file names. The radar, lightning strike, and local meteorological data and external commands are sent to the graphics generation mechanism which combines said data with geographical and topographical images maps to form weather images.

The functions performed by the host computer and the remote computer can be implemented by computer programs operating on generic computer systems, wherein the programmed computer systems operate in the manner described below. Specifically, the present invention can be thought of as including a host program and a remote program, each program comprising executable (i.e., computer-readable) instructions encoded on a memory device so as to cause the host computer and remote computer, respectively, to generally function in the following manner.

At the host computer, meteorological data is received from multiple data sources and is then multiplexed into a serial data stream. The data from each of the different data sources is individually configured into a frame having a header that identifies a particular one of the data source so that the data stream may be de-multiplexed at the remote computer. The serial data stream is then sent to the VBI inserter where it is inserted into the vertical blanking area of a television broadcast signal.

At the remote computer, once the serial data stream has been extracted from the received television broadcast signal, the cable communication mechanism of the remote program reads in the data stream and processes the individual frames according to their source as identified by the header. For instance, NWS messages are sent to a weather wire mechanism of the remote program where the messages are separated into individual files and given descriptive names for use by the graphics generating mechanism. As another example, the radar data and lightning data are sent directly to the graphics generation mechanism. The graphics generating system combines the radar data, lightning data, and NWS messages with geographical and topographical image maps in order to form weather images. The graphics generation mechanism can also create weather images of various formats including real-time radar on mapping, current conditions (usually with the crawling text), or forecast crawls or scrolls. Accordingly, the graphics generation mechanism can generate weather images of a single format for broadcast, or of several different formats for sequencing in a predetermined rotation for broadcast to cable subscribers.

In addition, the cable communication mechanism receives external commands via the modem, and sends the commands to the graphics generation mechanism for processing. Telecommunications terminal software installed on the remote computer enables the cable communication mechanism to talk to the modem. These external commands can control, for example, the types and sequence of weather image formats generated by the graphics generation mechanism, and the manner and content of crawling and scrolling text messages.

Other features and advantages of the present invention will become apparent to one with ordinary skill in the art upon examination of the following drawings and detailed description. It is intended that all such additional features and advantages be included herein within the scope of the present invention, as defined by the appended claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

FIG. 6 is an illustration of a weather image presenting current weather conditions with a crawling text, as generated by the graphics generation mechanism of FIG. 4;

FIG. 7 is an illustration of a weather image presenting forecast scroll, as generated by the graphics generation mechanism.

DETAILED DESCRIPTION OF PREFERRED EMBODIMENTS

The following description is of the best presently contemplated mode of carrying out the present invention. An automated real-time weather graphics generating system and method in accordance with the present invention has many uses in many different contexts, such as, between two cable service providers, between a local television broadcast station and a mobile weather unit (e.g., an automobile storm tracker), or as an automated weather tool that has a single local display which is not broadcasted. However, the particular application of the present invention as described hereinafter is directed to the use of an automated real-time weather graphics generating system and method of the present invention in the context of a local television broadcast station and a local cable source provider, wherein meteorological data is multiplexed into a serial data stream at the local television broadcast station and is transmitted to the cable service provider in the vertical blanking area of the television signal broadcast by the local station. The cable service provider then processes the meteorological data to produce weather images that are broadcast to subscriber over dedicated channels. Thus, the present description of the preferred embodiment is not to be taken in a limiting sense but is made merely for the purpose of describing the general principles of the invention. The scope of the invention should be determined by referencing the appended claims.

I. System Architecture

Figure 1:
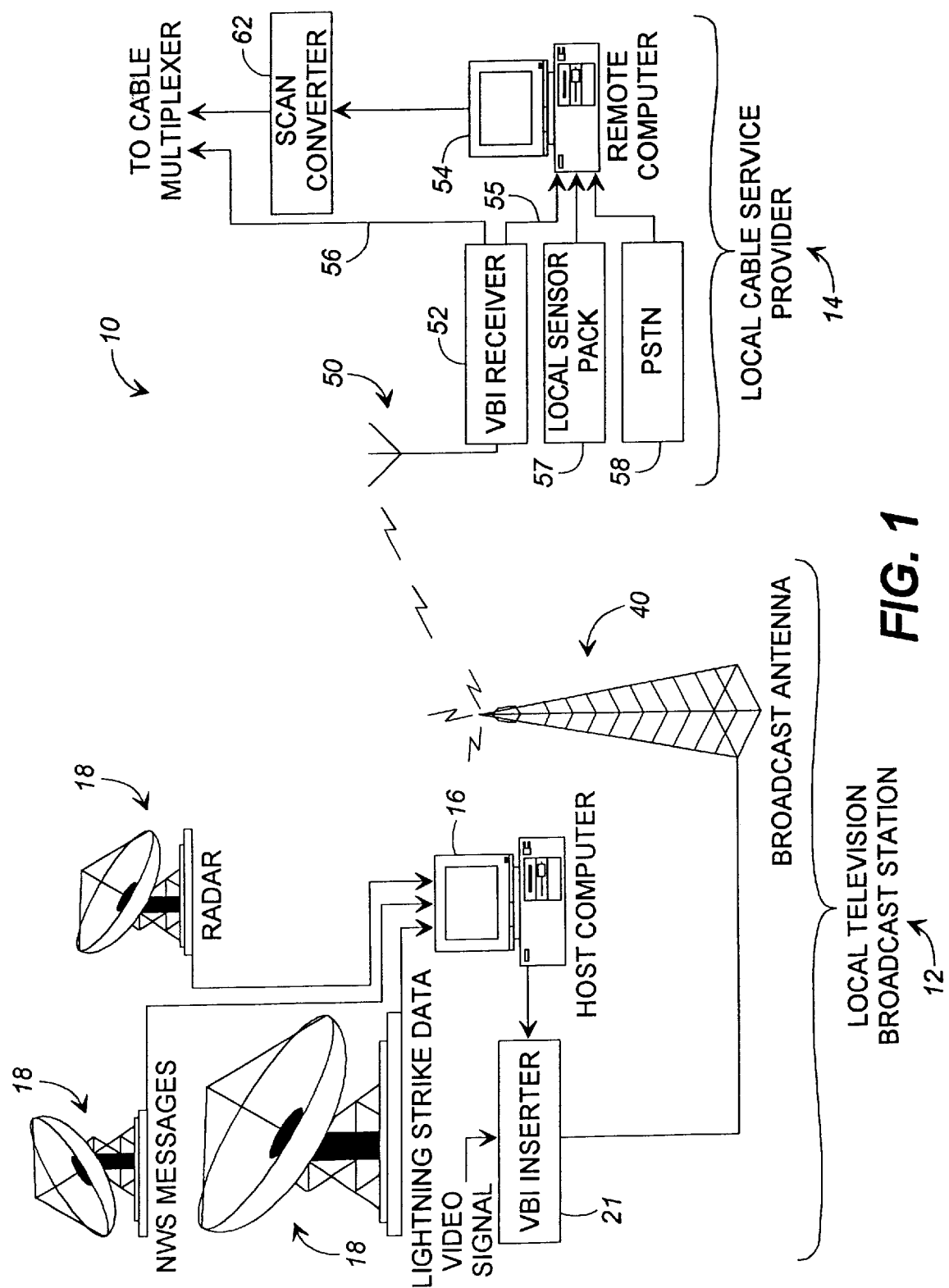
FIG. 1 is a schematic illustration of a weather graphics generating system in accordance with the present invention.

With reference to FIG. 1, an automated real-time weather graphics generating system 10 in accordance with the present invention is shown. The automated real-time weather graphics generating system 10 is implemented in part at a local television broadcast station 12 and in part at a local cable service provider 14. The local television broadcast station 12 includes a host computer 16 that is in communication with a plurality of weather data sources 18, though only three such weather data sources 18 are shown for illustrative purposes. The three weather data sources 18 shown in FIG. 1 include a National Weather Service (NWS) weather wire message service, a lightning strike data service, and radar. The data sources 18 may utilize one or more methods of communication such as satellite downlinks (as shown), cellular data, Internet, landline network (e.g., public switch telephone network, Ethernet, asynchronous transfer mode (ATM)), etc. The radar data source 18 is typically located at or near the local television broadcast station 12, and therefore, is connected directly to the host computer 16 over a network connection.

The weather data sources 18 provide particular meteorological data to the host computer 16 in standardized formats. For instance, the NWS weather wire data follows a specific format mandated by the National Oceanic Atmospheric Administration (NOAA). As another example, lightning strike data received from a provider such as Global Atmospherics, Inc., is provided in a specific format prescribed by the provided and known by the subscriber. As yet another example, radar data may be received from a radar system owned by the local television broadcast station 12, such as Model HDD 250 from RadTech, Inc., Colorado, U.S.A., which provides data in a radar data acquisition and control system (RDAC) format. In the preferred embodiment, the radar data received by the host computer 16 is formatted to include at least rainfall intensity information.

The received meteorological data is processed at the host computer 16 by a host program 20. Briefly, the host program 20 ingests the meteorological data from the different weather data sources 18 and outputs a single serial data stream that is sent to a vertical blanking interval (VBI) inserter 21. A host program 20 in accordance with the present invention can be stored on any computer-readable medium for use by or in a connection with a computer-related system or method. In the context of this document, a computer-readable medium is an electronic, magnetic, optical, holographic, or other physical device or means that can contain or store a computer program for use by or in connection with a computer related system or method.

Figure 2:
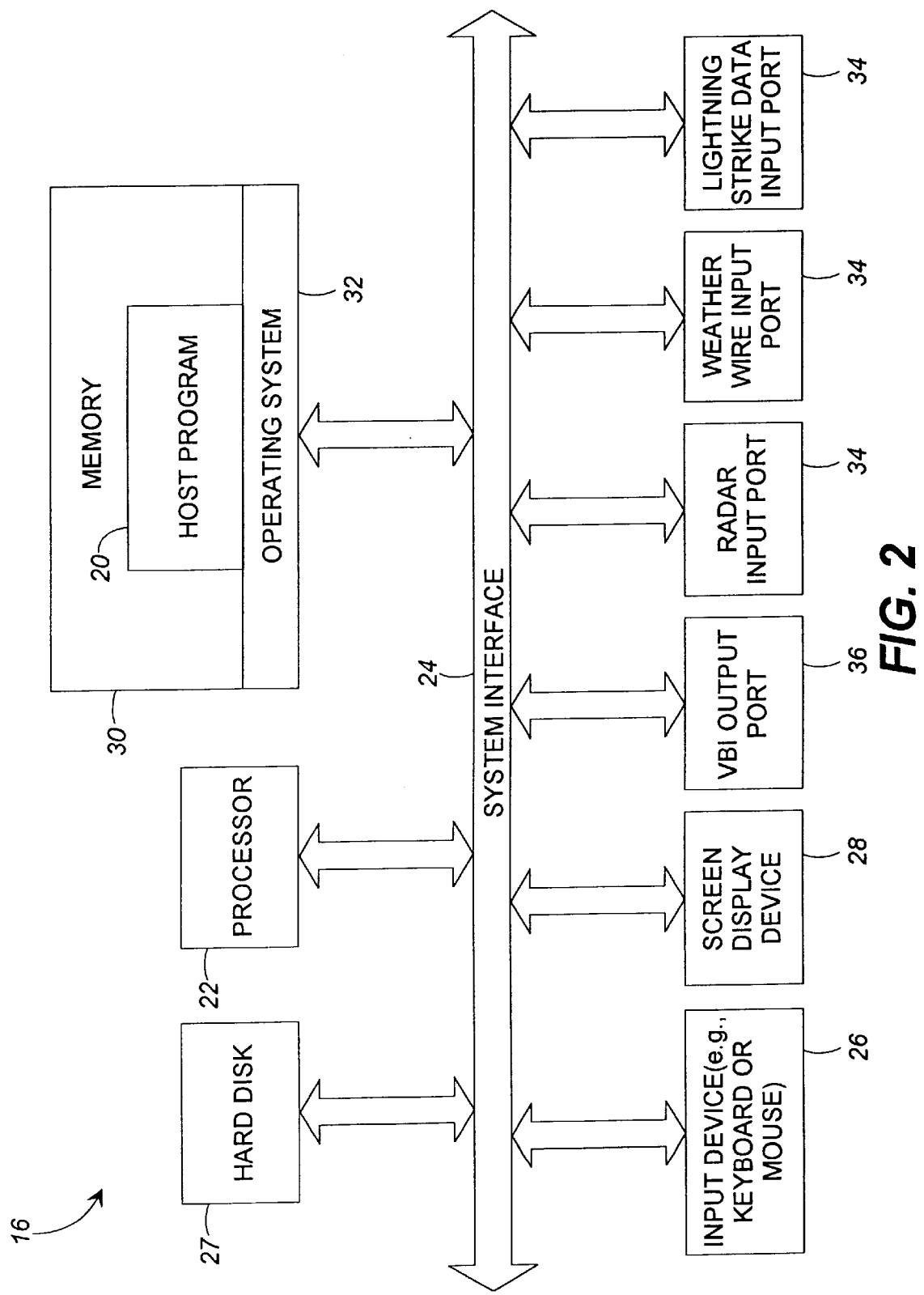
FIG. 2 is a block diagram illustrating the architecture and functionality of the host computer of the system of FIG. 1.

In FIG. 2, a block diagram of the computer hardware of an embodiment of the host computer 16 which includes the host program 20 in accordance with the present invention is shown. The host computer 16 includes a processor 22 that communicates with the other elements within the host computer 16 via a system interface 24. An input device 26, for example, a keyboard or mouse, is used to input data from the user, and a screen display device 28, for example, a monitor, is used to output data to the user. A memory 30 within the host computer 16 contains the host program 20 for imparting the functionality described herein. In addition, the memory 30 includes a conventional operating system 32 that communicates with the host program 20 and enables the execution of the host program 20 by the processor 22. One or more input ports 34 are provided for receiving the meteorological data from each of the weather data sources 18. Lastly, an VBI output port 36 is connected to the VBI inserter 21.

The host program 20 reads in the meteorological data received at each of the input ports 34 and multiplexes the data into a single serial data stream for transmission to the VBI inserter 21 by way of the VBI output port 38. Specifically, the host program 20 continually polls the input ports 34 for meteorological data. When the host program 20 sees data at one of the input ports 34, it reads in the data and copies the data into a data frame having a header identifying which weather data source 18 from which the meteorological data originated. The data frame is then written to the output port 36 in a serial fashion with other data frames for transmission to the VBI inserter 21. The host program 20 can be written in any suitable programming language for the particular operating system 32, but is preferably written in C or $C^{++}$, or a combination thereof, for operation on a Windows®-based 32-bit operating system, e.g., Windows 95® or Windows NT®. It is worth noting at this point that the data stream may be encrypted, encoded or compressed at the host computer 16 prior to being transmitted to the VBI inserter 21. For example, it may be desirable to compress the data in the data stream because the volume of the data may be too great for the limited bandwidth of the vertical blanking area of the television broadcast signal.

Referring back to FIG. 1, the data stream of weather messages is sent from the host computer 16 to the VBI inserter 21. A suitable VBI inserter is Model No. TES3 from Norpak, Corporation, Ontario, Canada. The VBI inserter 21 embeds the data stream into the vertical blanking area of the television signal of the local television broadcast station 12. The television signal can be any suitable television signal compatible with the appropriate standards of that country, for example, the National Television Standards Committee (NTSC) in the United States or phase alternating line (PAL) in Europe. A broadcast antenna 40 is then used to transmit or broadcast the television signal over a predetermined coverage area defined by such factors as the transmit signal strength and the geographic terrain surrounding the broadcast antenna 40.

The television broadcast signal is received by a television antenna 50 at the local cable service provider 14. It is noted that the television broadcast signal could have been transmitted to the local cable service provider 14 by other suitable means such as over a coaxial cable distribution network or over the public switched telephone network (PSTN) using high speed modems such as those utilizing digital subscriber line (DSL) technology. At the local cable service provider 14, the received television signal is sent to a VBI receiver 52. A suitable VBI receiver 52 is Model No. TTX625 from Norpak, Corporation. The VBI receiver 52 separates the serial data stream of multiplexed meteorological data from the television broadcast signal and sends the serial data stream to a remote computer 54 via link 55. The television broadcast signal is sent to a cable multiplexer (i.e., a cable headend) of the local cable service provider 14 via link 56. The remote computer 54 also receives meteorological from other local sensors such as a local sensor pack 57. A suitable local sensor pack 57 is Model No. WPS-10S from Texas Weather Instruments, Inc., Texas, U.S.A. The local meteorological data collected by the local sensor pack 57 includes, for example, wind direction, wind speed, solar radiation levels, inside temperature, outside temperature, relative humidity, barometric pressure, daily rainfall, and monthly rainfall. In addition, the remote computer 54 is preferably connected to the PSTN 58 for receiving external commands from a user that is remote to the local cable service provider 14 for controlling the operations of the remote computer 54, as discussed in further detail below.

Briefly stated, the remote computer 54 includes a remote program 60 that ingests (1) the serial data stream from the VBI receiver 52, (2) the local meteorological data from the local sensor pack 57, and (3) any external commands received over the PSTN 58, and then combines the meteorological data with image maps of geographical and topographical features to create weather images. The weather images are converted by a scan converter 62 from a display standard such as visual graphics array (VGA) to a television standard such as NTSC or PAL for broadcast to cable subscribers over dedicated channels.

Figure 3:
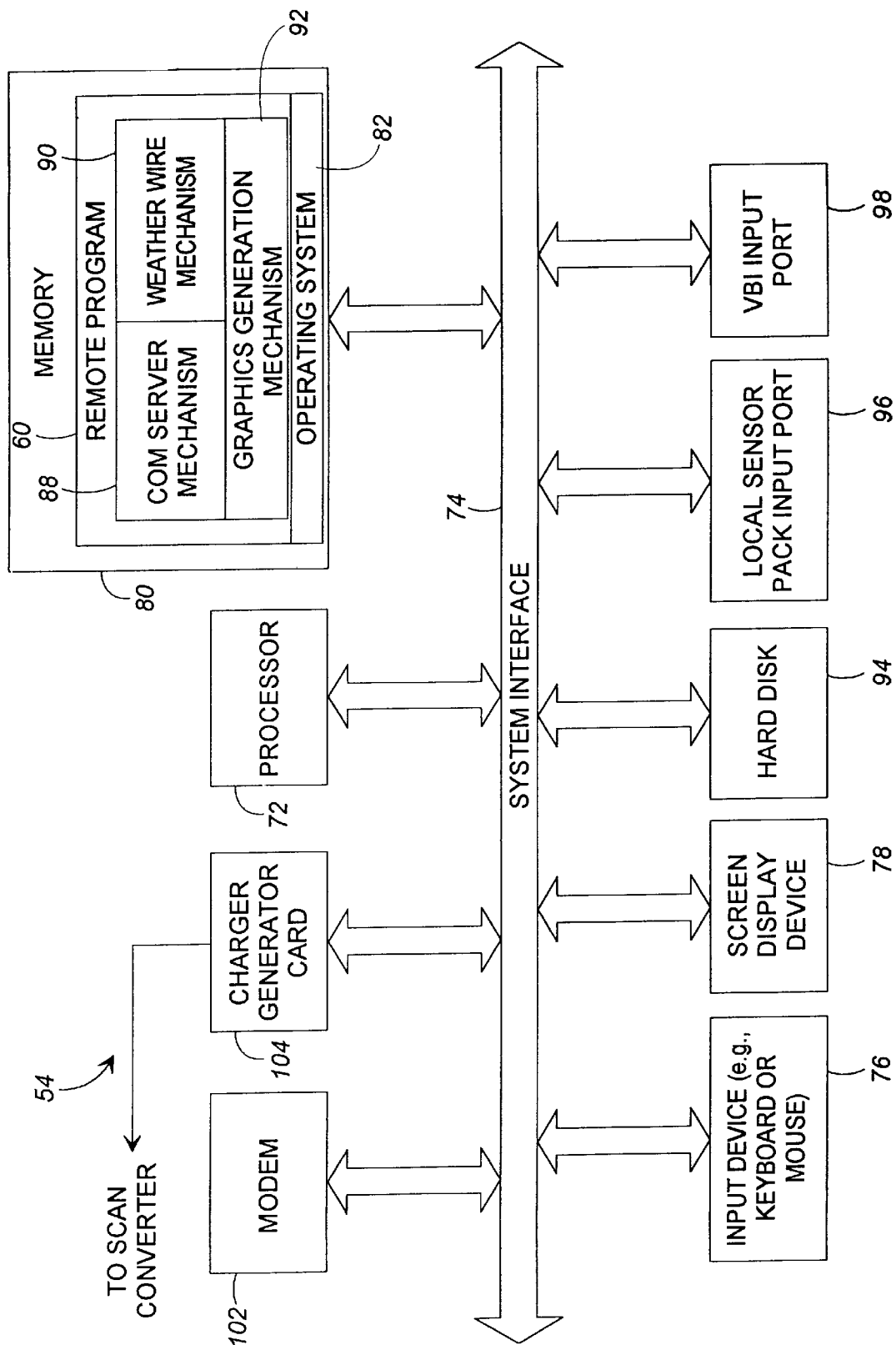
FIG. 3 is a block diagram illustrating the architecture and functionality of the remote computer of the system of FIG. 1.

In FIG. 3, a block diagram of the computer hardware of an embodiment of the remote computer 54 that includes a remote program 60 in accordance with the present invention is shown. The remote computer 54 includes a processor 72 that communicates with the other elements of the remote computer 54 via a system interface 74. An input device 76, for example, a keyboard or mouse, is used to input data from a user of the remote computer 54, and a screen display device 78, for example, a monitor, is used to output data to the user. A memory 80 within the remote computer 54 contains the remote program 60. Further, the memory includes a conventional operating system 82 that communicates with the remote program 60 and enables the execution of the remote program 60 by the processor 72. The remote program 60 includes the following three software modules or mechanisms: a cable communication mechanism 88, a weather wire mechanism 90, and a graphics generation mechanism 92. Each of the mechanisms 88, 90, 92 is discussed in detail below with reference to FIG. 4.

A hard disk 94 within the remote computer 54 stores application files and data, as is well known in the industry. A local sensor pack input port 96 receives meteorological data from the local sensor pack 57 and a VBI input port 98 receives the serial data stream from the VBI receiver 52. In addition, a modem 102 interconnects the remote computer 54 and the PSTN for receiving external commands from a user remotely located with respect to the remote computer 54. Lastly, a character generator card 104 such as a Model PC CODI from Chyron, Inc., New York, U.S.A., is provided to receive commands from the remote program 60 for generating characters that are laid over the weather images generated by the graphics generation mechanism 92, as is discussed in further detail below.

A remote program 60 in accordance with the present invention can be stored on any computer-readable medium for use by or in connection with a computer-related system or method. Further, the remote program 60 can be written in any suitable programming language for the operating system 82, but is preferably written in C or $C^{++}$, or a combination thereof, for operation on a Windows®-based 32-bit operating system, e.g., Windows 95® or Windows NT®.

Figure 4:
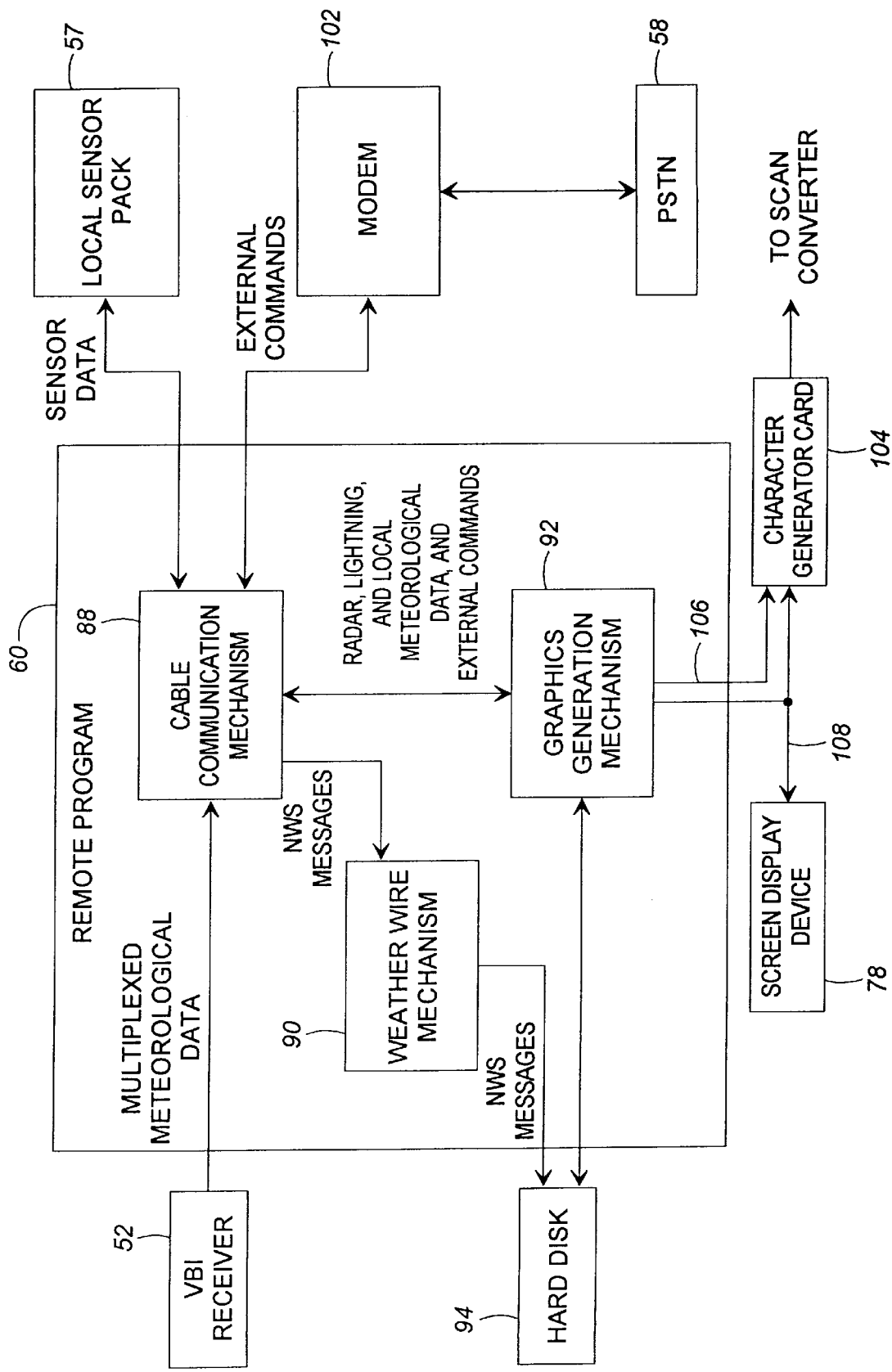
FIG. 4 is a block diagram of the remote program of FIG. 3.

In reference to FIG. 4, the functionality of the cable communication mechanism 88, weather wire mechanism 90, and graphics generation mechanism 92 of the remote program 60 are illustrated. The cable communication mechanism 88 reads in the multiplexed meteorological data from the VBI receiver 52 and the local sensor pack 57, and interfaces with the modem 102 for receiving external commands sent across the PSTN 58. Telecommunications terminal software installed on the remote computer enables the cable communication mechanism 88 to talk to the modem 102. The cable communication mechanism 88 then dispatches this information to the weather wire mechanism 90 and the graphics generation mechanism 92 as appropriate. Specifically, the cable communication mechanism 88 filters the NWS weather wire messages using the header information in the data frame, and then sends the NWS weather wire messages to the weather wire mechanism 90 for processing. The radar data and lightning strike data are likewise filtered using the header information, and are sent to the graphics generation mechanism 92 along with local meteorological data and external commands received by the cable communication mechanism 88. In a preferred embodiment, wherein the operating system 82 is Windows®-based, the cable communication mechanism utilizes a dynamic data exchange (DDE) protocol to send data to the weather wire mechanism 90 and the graphics generation mechanism 92. In this sense, the cable communication mechanism 88 is a server (publisher) and the weather wire mechanism 90 and the graphics generation mechanism 92 are clients (subscribers).

The weather wire mechanism 90 receives the NWS messages from the cable communication mechanism 88 via a DDE program-to-program link. The NWS messages are then parsed and each NWS message is written into an individual file with a descriptive and unique file name. Unique, in this sense, means that two thunderstorm warnings, for example, are kept in separate files that are further distinguished by a number such as TSTORM1 and TSTORM2. The files are stored on the hard disk 94 where they are available to the graphics generation mechanism 92 for periodic polling for messages that have not been read. On a periodic basis, the files are purged from the hard drive 94 to remove outdated files. The NWS messages typically provide information regarding current weather conditions such as temperature, rainfall, and humidity for a general area. The NWS messages also provide NWS watch and warning information for specific counties within a coverage area. As is well known in the art, the NWS messages received at the host computer 20 (FIG. 1) can be filtered according to user defined parameters for a specific state, city, or a specific category (e.g., high seas forecast), so that the number of messages received is limited to those most likely to be relevant to the local area.

Figure 5:
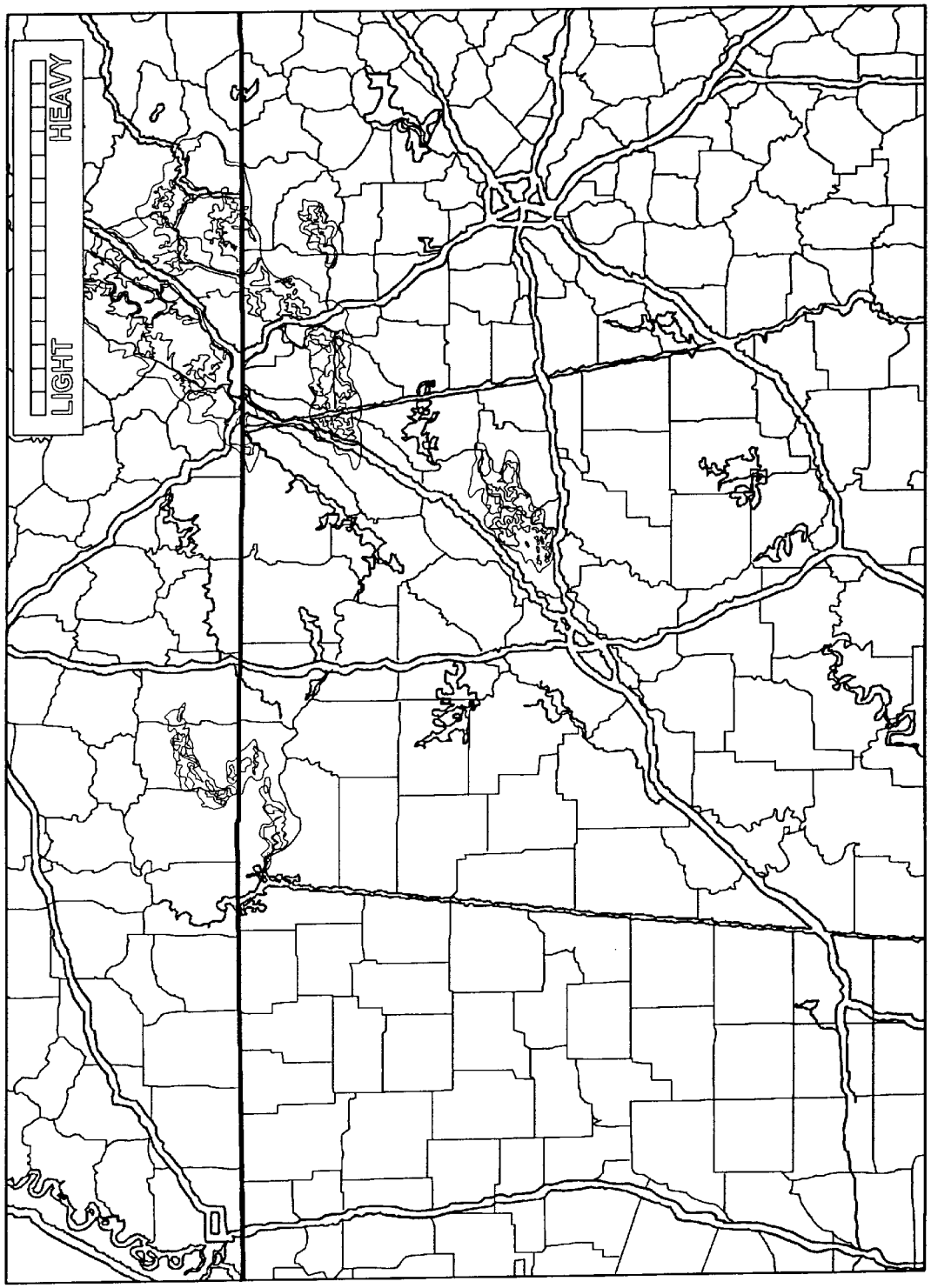
FIG. 5 is an illustration of a weather image presenting radar data on mapping, as generated by the graphics generation mechanism of FIG. 4.

The graphics generation mechanism 92 combines the radar data, the lightning data, the local meteorological data, and the NWS messages with geographic and topographic image maps to create weather images in one or more different formats. For example, FIG. 5 is a still shot of an animated real-time radar weather format generated by the graphics generation mechanism 92, FIG. 6 is a still shot of a current conditions format with crawling text generated by the graphics generation mechanism 92, and FIG. 7 is a still shot of a forecast scrolling format generated by the graphics generation mechanism 92. With regard to FIG. 6, the crawling text typically crawls across the screen horizontally, though the text could alternatively scroll vertically up or down the screen. Further, the current conditions usually include sky conditions (e.g., cloudy or sunny), rainfall accumulation, humidities, temperatures, etc. The graphics generation mechanism 92 can generate weather images in a single format continuously, or it may generate weather images in two or more different formats and sequence through the formats in a manner prescribed by the user.

With specific regard to the operation of the graphics generation mechanism 92, the graphics generation mechanism 92 maintains a geographical database of geographical views with associated topography in the form of bitmaps. The bitmaps comprise layers of objects such as state lines, county lines, interstates, highways, city streets, and water bodies. In addition, linked to the geographical database is a places database with community names, latitude, longitudes, abbreviated names, and priority levels. These two database were combine to form bitmaps to which the meteorological data was overlaid. Particularly, the radar data, lightning data, local meteorological data, and NWS messages are ingested by the graphics generation mechanism 92 and translated into a graphical form for combining with the different bitmaps as an object layer(s) in order to generate views of live (i.e., real-time) weather conditions.

The various meteorological data is essentially painted over an appropriate one of the bitmaps by correlating the latitudinal and longitudinal coordinates of the bitmap and the meteorological data. There are several commercially available programs for combining meteorological data and bitmaps for generating weather images which are suitable for operation as the graphics generation mechanism 92. For example, the Radar-Net® and FasTrac® computer software programs system from Barons Services, Inc., Huntsville, Ala., are two such systems. In general, the radar data comprising a single radar sweep is divided into radials having X number of bins, each sequential bin being further from the center of the radar device. Each bin has associated with it a number representing the intensity of the rain at that general point with reference to the radar device. Therefore, given the position of the radar device on the bitmap, the intensity level for a particular bin of a particular radial, one is able locate a specific position on the bitmap and then color that position with a color defining that intensity level. Therefore, as each bind for each radial is translated into a position on the bitmap and an appropriate color is painted for representing the intensity level, the radar sweep is essentially painted on the bitmap. Further, multiple bitmaps can be replayed in sequence to create weather animation. The bitmaps forming an animation sequence can be looped to create a repeating presentation of the movement of a storm cell over a discrete period of time.

The weather images are generated in a VGA format or other similar display standard, and therefore, can be sent directly to the screen display device 78 over link 108 for display. In addition, the weather images are sent to the character generator card 104 over link 108 so that textual messages can be added. The local meteorological data and the NWS messages can be used to generate textual messages with the character generation card 104 using commands sent over link 106. The textual messages are then be laid over the bitmaps as yet another object layer. The textual messages can be crawled or scrolled in a variety of ways only limited by the ability of the character generation card 104. Thus, the output of the character generator card 104 is a VGA video signal including crawling and scrolling text messages.

Further, it is noted that the sequence of formats and the type of crawling or scrolling of text can be remotely controlled by commands sent over the PSTN connection and received via the modem 102. In a like manner, the user is able to direct the remote program 60 to generate a particular messages that can be crawled or scrolled across the weather images.

Since the remote computer 54 generates weather images as VGA video signals, the signals are be converted to a television compatible format (e.g., NTSC or PAL) for broadcast to subscribers. Thus, the weather images are sent to the scan converter 62 (FIG. 1), such as the Scan Do Pro Model from Communication Specialist, Inc., New York, U.S.A., for conversion. Once converted, the television compatible signal is sent to the cable multiplexer where it is combined with other television signal for transmission to subscribers over dedicated channels. As evident from the description above, the automated real-time weather graphics generating system 10 can be operated without supervision, that is, as an automated system. In fact, most any change or modification could be performed remotely over the PSTN 58 via modem 102.

II. Operation

The preferred operation and sequence of events corresponding to the automated real-time weather graphics generating system of the present invention and the associated methodology are described hereinafter.

Figure 8:
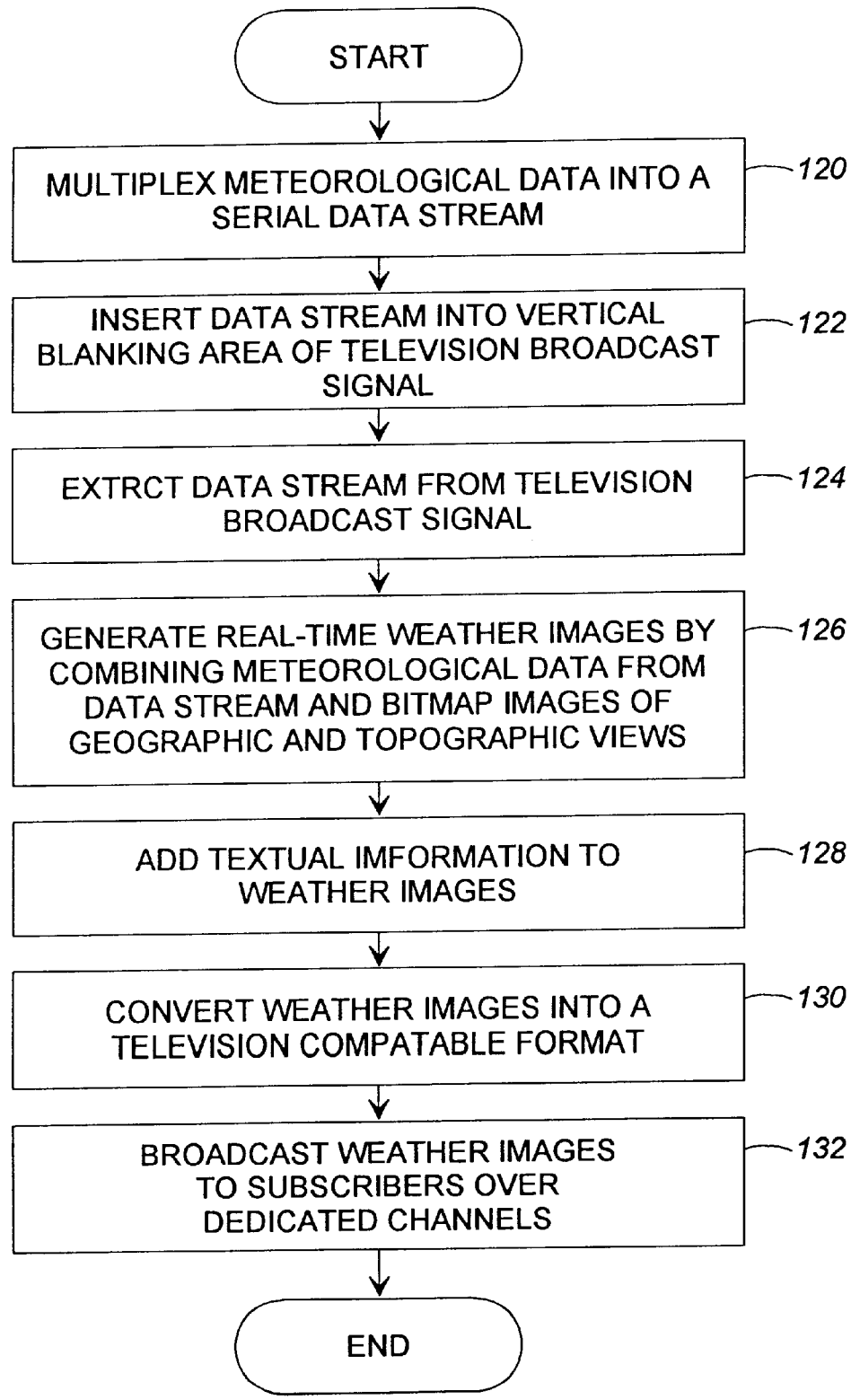
FIG. 8 is a flowchart of the operation of the weather graphics generating system of FIG. 1.

With reference to FIG. 8, the host program 20 initially receives meteorological data from the data sources 18 and multiplexes the meteorological data into a serial data stream, as indicated by block 120. The data stream is then inserted into the vertical blanking area of a television broadcast signal by the VBI inserter 21 at block 122. The television broadcast signal is then broadcast by the broadcast antenna 40 and received by a television antenna 50 at a remote location, such as a local cable service provider 14. At block 122, the data stream is filtered from the received broadcast television signal. The meteorological data comprising the data stream is processed and combined with bitmaps of geographical and topographical views to generate real-time weather images, as indicated at module 126. Next, textual information is added to the weather images, typically as crawling or scrolling messages, as indicated by block 128. At block 130, the weather images are converted into a television compatible format for broadcast to subscribers. As previously mentioned, suitable television formats include NTSC and PAL. Lastly, at block 132, the television compatible signals are broadcast to subscribers on dedicated channels for continuous viewing.

In concluding the detailed description, it should be noted that it will be obvious to those skilled in the art that many variations and modifications may be made to the preferred embodiments without substantially departing from the principles of the present invention. All such variations and modifications are intended to be included herein within the scope of the present invention, as set forth in the following claims. Further, in the claims hereafter, corresponding structures, materials, acts, and equivalents of all means or step plus function elements are intended to include any structures, materials, or acts for performing the function in combination with other claimed elements as specifically claimed.

That which is claimed is:

1. A system for providing automated real-time localized weather graphics, comprising:

a host computer that receives meteorological data from real-time meteorological sources and converts said meteorological data into a data stream;

a vertical blanking interval (VBI) inserter that inserts said data stream into a vertical blanking area of a television broadcast signal for broadcast to a remote location;

a VBI receiver at said remote location that filters said data stream from said television broadcast signal received at said remote location; and a remote computer that combines said data stream once translated into graphical form and geographical views stored within said remote computer to form localized real-time weather images comprising said meteorological data.

2. The system of claim 1, further comprising a plurality of said real-time meteorological data sources, and wherein said meteorological data from each of said real-time meteorological data sources is multiplexed into said data stream.

3. The system of claim 1, further comprising a scan converter that converts said weather images to a television compatible signal for broadcast to subscribers.

4. The system of claim 3, wherein said television compatible signal is a phase alternating line (PAL) format.

5. The system of claim 3, wherein said television compatible signal is a National television Standards Committee (NTSC) format.

6. The system of claim 1, further comprising a display device for displaying said weather images.

7. The system of claim 1, wherein said remote computer further combines meteorological data from a local sensor to form said weather images.

8. The system of claim 1, wherein said remote computer further includes a character generator that adds textual data to said weather views.

9. The system of claim 1, wherein said remote computer stores said weather images to create a looped sequence of weather images for a discrete period of time.

10. The system of claim 1, wherein said plurality of real-time meteorological data sources includes a National Weather Service (NWS) weather wire data service and a radar source.

11. The system of claim 1, further comprising local weather sensor pack that provides local meteorological data to said remote computer, wherein said remote computer combines said local meteorological data with said data stream and said geographical views to form said weather images.

12. The system of claim 1, wherein said remote computer includes a graphics generation mechanism that combines said meteorological data with geographical views to form weather images.

13. The system of claim 12, wherein said graphics generation mechanism comprises a computer software program that overlays said meteorological data onto said geographical views by correlating the latitudinal and longitudinal coordinates of said geographical views and said meteorological data.

14. The system of claim 12, wherein said remote computer further comprises a cable communication mechanism that receives said data stream from said VBI receiver and sends said meteorological data in said data stream to said graphics generation mechanism.

15. The system of claim 14, wherein said remote computer further comprises a weather wire mechanism that receives meteorological data from said cable communication mechanism and places said meteorological data in individual files with descriptive names for use by said graphics generation mechanism.

16. A computer-based method for providing automated real-time localized weather graphics, comprising the steps of:

receiving a television broadcast signal from a host computer that receives meteorological data from a plurality of real-time sources, converts said meteorological data into a data stream, and inserts said data stream into said television broadcast signal;

removing said data stream representative of said meteorological data from said television broadcast signal; and combining within a remote computer said data stream once translated into graphical form and geographical views stored in said remote computer to form weather images comprising said meteorological data.

17. The method of claim 16, further including the step of displaying a plurality of said weather images in a real-time sequence.

18. The method of claim 16, further including the step of converting said weather images to a television compatible signal.

19. The method of claim 16, further including the step of adding textual data to said weather images.

20. The method of claim 16, wherein said step of removing said data stream includes the step of tuning a vertical blanking interval (VBI) receiver.

21. The method of claim 16, further including the step of inserting said data stream into a vertical blanking interval (VBI) area of said television broadcast signal.

22. The method of claim 21, wherein the step of inserting said data stream includes the step of inserting said data stream into a vertical blanking interval (VBI) of said television broadcast signal.

23. A computer-based system for providing automated real-time localized weather graphics, comprising:

means for receiving a television broadcast signal from a host computer that receives meteorological data from a plurality of real-time sources;

means for removing a data stream representative of said meteorological data from said television broadcast signal; and means for combining within a remote computer said data stream and geographical views stored in said remote computer to form localized real-time weather images comprising said meteorological data.

24. The computer-based system of claim 23, further comprising means for converting said weather images to a television compatible signal.

25. The computer-based system of claim 23, further comprising means for adding textual data to said weather images.

26. The computer-based system of claim 23, further comprising means for inserting said data stream into said television broadcast signal.

27. The computer-based system of claim 26, wherein said means for inserting said data stream includes means for inserting said data stream into a vertical blanking interval (VBI) of said television broadcast signal.

28. A computer-based system for providing automated real-time localized weather graphics, comprising:

a host computer comprising:

means for receiving meteorological data from a plurality of real-time meteorological data sources, means for inserting said meteorological data into a vertical blanking area of a television broadcast signal; and a remote computer comprising:
   local geographic views stored therein,
   means for receiving said television broadcast signal,
   means for removing said meteorological data from said television broadcast signal,
   means for combining said meteorological data and said geographical views to form weather images comprising said meteorological data.

29. The system of claim 28, further comprising a plurality of said meteorological data sources, and wherein said meteorological data from each of said meteorological data sources is multiplexed into a data stream.

30. The system of claim 29, further comprising means for removing said data stream from said television broadcast signal.

31. The system of claim 30, wherein said means for combining combines said data stream once translated into graphical form and geographical views stored in said remote computer to form localized real-time weather images.

\* \* \* \* \*